3,236,913
PROCESS FOR COLORING TEXTILE MATERIALS AND FOILS
Gerhard Pfeiffer, Kelkheim, Taunus, Germany, Helmut Schmidt, Mountainside, N.J., and Kurt Stetzelberg, Frankfurt am Main, and Fritz Winkler, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Aug. 20, 1962, Ser. No. 218,094
Claims priority, application Germany, Aug. 22, 1961, F 34,749
15 Claims. (Cl. 260—856)

The present invention provides a process for preparing true colorations and prints on fibrous materials and foils. In contradistinction to known processes, not a pigment dyestuff but a film from synthetic resin colored by a chemical reaction is fixed on the substratum according to the process of the present invention.

We have found that colorations and prints, which are distinguished by a good resistance to wet and dry cleaning, can be prepared on fibrous materials and foils, when applying to these materials aqueous preparations such as printing pastes or padding liquors which contain reaction products of diketene with polyvinyl alcohols modified by polyalkylene glycol or polyalkylene oxide, stabilized diazonium compounds, and advantageously also aminoplast precondensation products whose methylol radicals may be partially or totally etherified. Fixation of the colorations and prints is carried out by heating to temperatures above 90° C., namely by either applying a neutral or acidic steaming process at a temperature within the range from about 90° C. to about 120° C. during about 5–10 minutes or by dry heating to elevated temperatures, preferably during 30 seconds up to 10 minutes, to temperatures above 100° C., and, depending on the nature of the fibrous material, even up to about 200° C. In both cases there may follow a treatment for about 1 minute at about 95–100° C. with an aqueous solution of about 2–5 g./l. of formaldehyde. Subsequently, the goods are soaped and rinsed in the usual manner. Fixation may also be carried by steaming under the above-mentioned conditions in the presence of formaldehyde, so that the aftertreatment with formaldehyde which may be applied additionally is economized.

The reaction products of diketene with modified polyvinyl alcohols, used in the process of the present invention as film forming products, contain a polyvinyl acetylacetate group of the formula

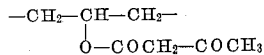

which is capable of entering a coupling reaction with the diazonium compounds. The diketene reaction products thus act simultaneously as film former and as coupling component for the diazonium compounds. By the coupling reaction, which already sets in slowly at room temperature, and by the elevated temperature, by which the fixation is completed more rapidly, colored synthetic resins are obtained which permit the preparation of very fast and resistant colorations on textile materials and two-dimensional structures.

The ratio at which the individual components are used in the process of the present invention can vary within wide limits. The quantity of diazonium compounds depends in the first instance on the desired depth of coloration. In general, about 0.05 to 0.5 part by weight, preferably 0.1 to 0.3 part by weight, of the stabilized diazonium compounds and, if desired, 0.5 to 1.5 part by weight of the aminoplast precondensation products are used per 1 part of the reaction product of diketene with modified polyvinyl alcohol.

The aforesaid reaction products of diketene with modified polyvinyl alcohols are products that contain a high number of acetoacetic ester groups and that are obtained by reacting diketene, not with pure or partially esterified polyvinyl alcohol as described in German Patent 940,680, but with polyvinyl alcohols, which are modified by polyalkylene glycol or polyalkylene oxide and which thus contain polyalkylene glycol radicals in the molecule, as described in our co-pending U.S. patent application Ser. No. 212,142, filed July 24, 1962 (corresponding to German patent application F 34,533, IVd/39c).

These modified polyvinyl alcohols used in the process of the present invention as the starting materials for the reaction with diketene may be obtained, for example, by (a) oxalkylating polyvinyl alcohols, for example according to the process described in U.S. Patent 2,844,570, or according to the process described in Belgian Patent No. 614,672, dated March 5, 1962 (corresponding to German patent application F 33,349,IVb/39c) or by (b) completely or partially saponifying the polyvinyl ester portion of graft copolymers of vinyl esters, preferably vinyl acetate on polyalkylene glycol.

The graft copolymers mentioned under (b) above and their saponification products can be prepared, for example, by the methods described in German Patents 1,077,430, 1,110,419, 1,081,229, 1,094,457, and in French Patent 1,291,300.

For the reaction with diketene, it is preferable to use the graft copolymers obtained by the processes described in German Patents 1,081 and 1,094,457 which have K-values from about 15 to about 120, according to Fikentscher "Cellulose Chemie," volume 13, page 58 (1932), and whose vinyl ester units have been converted, completely or at least partially, into vinyl alcohol units by alcoholysis.

For preparing these graft copolymers, vinyl esters of saturated carboxylic acids that contain 1–4 carbon atoms, for example, vinyl acetate, vinyl propionate or vinyl butyrate, or also mixtures of these vinyl esters, are polymerized in homogeneous phase in the presence of polyalkylene glycols as trunk polymers, if desired with the use of solvents, in the presence of free-radical polymerization catalysts. As polyalkylene glycols, there may be used polyalkylene glycols having molecular weights in the range from about 400 to 1,500,000, preferably 1000 up to 500,000, and 2–4 C-atoms in the alkylene unit, for example, polyethylene glycols, polypropylene glycols or also oxethylated polypropylene glycols and higher homologs of the polypropylene glycol or mixtures of these polyalkylene glycols. As free-radical polymerization catalysts, the usual radical-forming organo-soluble types may be used in amounts of about 0.01 to 10%, calculated on the weight of the monomers used. As examples, there are mentioned: diacetyl peroxide, dibenzoyl peroxide, dilauryl peroxide, and α,α-azodiisobutyronitrile.

Subsequently the vinyl ester component of the graft copolymers is partially or totally saponified. Saponification of the vinyl ester group is carried out in the presence of lower alcohols, preferably methanol or ethanol, or even in a mixture of methanol and methylacetate; in general, it may be carried out according to known methods with alkalis or acids, at room temperature or also at elevated temperatures, for example, the boiling temperature of the solvent, as desired either totally or partially, preferably so that 20–100% by weight of the ester units contained in the graft copolymers are hydrolyzed.

The modified polyvinyl alcohols prepared by the cited processes thus contain in addition to vinyl alcohol groups and even vinyl ester groups, elements of the formula

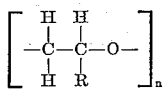

eventually with an OH group in terminal position. In the above formula, R represents hydrogen, an alkyl radical having preferably 1–6 carbon atoms or an aryl radical, preferably a mononucleic aryl radical, n represents a whole number between 10 and 50,000, preferably between 20 and 10,000.

For the process of the present invention there may be used for the reaction with diketene preferably such modified polyvinyl alcohols whose proportion of oxalkyl units of the above formula amounts to about 15–60 percent by weight, preferably 20–55 percent by weight. The proportion of vinyl alcohol or vinyl ester units ranges thus from about 85 to 40 percent by weight, preferably 80 to 45 percent by weight.

The reaction of the modified polyvinyl alcohols with diketene can be carried out by several known processes; thus, it can be carried out for example, by heating the components in dimethylformamide, and ketones such as methyl-ethyl ketone or cyclohexanone. However, it is preferable to use the process, proposed by Staudinger and Häberle (cf. "Die Makromolekulare Chemie," volume IX (1953), page 55 et seq., and German Patent 940,860), of a reaction in organic acids, especially glacial acetic acid, with catalytical amounts of weakly basic or acidic catalysts, for example, sodium acetate, at temperatures in the range from about 40–90° C. In contradistinction to other processes, one can operate according to this method with nearly stoichiometric quantities of diketene and colorless products are obtained, while with other solvents there must be used an excess of diketene and dark colored products are obtained.

In order to prevent autoxidation which might cause a premature cross-linking of the final product, it is advantageous to operate under exclusion of atomspheric oxygen.

For the reaction, the anhydrous modified polyvinyl alcohol in the form of a fine powder is suspended in about 8 to 10 times the quantity of an organic acid, for example, glacial acetic acid. After the addition of 2 percent by weight of anhydrous sodium acetate, calculated on the modified polyvinyl alcohol, the reaction is carried out, while stirring, with 75 to 85% of the stoichiometric quantity of diketene. Since, when polyvinyl alcohols are used, a complete reaction of the free hydroxyl groups does not take place in the same way as with pure polyvinyl alcohols not even if an excess of diketene is used, it is not at all necessary to use the diketene in stoichiometrical quantity or in excess. The reaction sets in at about 45° C., and the temperature can rise during the course of the reaction to about 60° C. To complete the reaction, it is advantageous to keep the temperature at about 60–80° C. for some time. With increasing esterification, first a swelling occurs by passing over a viscosity phase. Finally, complete solution takes place. From this solution, the major part of the organic acid (acetic acid) can be recovered by distillation under reduced pressure and can be used for further reactions.

As stabilized diazonium compounds, there may be used in the process of the present invention in the first instance the compounds available in the form of fast dyeing salts (cf. for example, Ullmann, "Encyclopädie der technischen Chemie," 3rd edition, München 1954, volume 5, pages 795–797, and volume 4, pages 138 and 139).

As aminoplast precondensation products which may be partially or totally etherified there may be used especially those obtained from 1 mol of urea and 1–4 mols of formaldehyde or from 1 mol of melamine and 1–6 mols of formaldehyde, such as monomethylolurea, dimethylolurea, trimethylolurea, monomethylolmelamine, dimethylolmelamine, pentamethylolmelamine, and hexamethylolmelamine. There may also be used mixtures of the aminoplast formers. The methylol radicals in these precondensation products may be partially or totally etherified with low molecular alcohols. For the etherification, there may be used low molecular, monofunctional or bisfunctional aliphatic alcohols having 1–4 carbon atoms, for example, methanol, ethanol, propanol, butanol, ethylene glycol, and butanediol-1.4, or mixtures of these alcohols.

For printing, the stabilized diazonium compounds as the coloring components are admixed with the printing paste consisting of ketenized polyvinyl alcohol derivatives, a thickener such as tragacanth, alginate, starch, vegetable gum, a benzine emulsion, and the like, and, if desired, aminoplast precondensation products. It is also possible to apply first the printing paste consisting of the aforesaid 2 or 3 components, the binding agent, thickener and, if desired, also precondensation products, to the substratum and then to effect the coupling on the places printed by immersion of the material so printed and dried at a temperature of up to 80° C. into a diazonium solution.

For coloring, the material to be colored is impregnated, in an analogous method of operation, with a solution containing the ketenized polyvinyl alcohol derivative and, if desired, an aminoplast precondensation product and, after drying at temperatures of up to 80° C., colored by padding with a solution of diazonium salt. There may also be used a padding liquor which already contains the stabilized diazonium compounds and hence all 2 or 3 components.

The final treatment is carried out as already described, either by steaming or by dry heating, if desired with subsequent treatment with formaldehyde, or by steaming in the presence of formaldehyde.

As materials which can be colored or printed by the process of the present invention, there are mentioned, for example, fabrics, knit fabrics, fiber fleeces, and the like, from native or regenerated cellulose, acetylated cellulose, wool, silk or synthetic fibers such as those made from polyamide, polyester, polyacrylonitrile, polyvinyl chloride, further glass fibers, or asbestos, foils of any kind, for example those made on the basis of cellulose or from synthetic material, as well as paper, cardboard, and the like.

The process of the present invention permits the preparation of colorations and prints that have very good fastness properties and an agreeable handle.

When carrying out the process of the present invention in using reaction products of diketene with modified polyvinyl alcohols, there are obtained colored films from synthetic resin which have a soft handle and are very elastic and which are therefore more resistant to washing and rubbing than, for example, films prepared with the use of reaction products of polyvinyl alcohols and diketene.

The following examples illustrate the invention, but they are not intended to limit it thereto.

EXAMPLE 1

A cotton fabric was printed with a printing paste with the following composition:

100 parts by weight of an aqueous solution of 25% strength of the reaction product of diketene with modified polyvinyl alcohol, prepared according to the process described hereinafter 30 parts by weight of an aqueous solution of 80% strength of dimethylol urea, etherified with 1 mol of methanol and 1 mol of butanediol-1,4 per 1 mol of precondensation product 10 parts by weight of the diazonium chloride of 5-amino-2-benzoylamino - 1,4 - diethoxy - benzene-hydrochloride, stabilized by zinc chloride and 760 parts by weight of the oil-in-water emulsion described hereinafter 1000 parts by weight After printing and drying, the goods were heated for 5 minutes to 150° C., then aftertreated for 1 minute at 95° C. with a solution containing per liter 2 g. of formaldehyde (40% strength) and then rinsed and dried. The vivid reddish yellow print exhibited a soft handle and good fastness.

Preparation of the reaction product of diketene with a modified polyvinyl alcohol:

(a) *Preparation of the starting graft polymer.*—300 parts by weight of polyethylene glycol having a molecular weight of about 25,000 were melted at 90° C. water bath temperature in a vessel provided with stirrer and reflux condenser. 50–100 parts by weight of a solution of 1700 parts by weight of vinyl acetate and 16 parts by weight of dibenzoyl peroxide were then added to the molten mass. After a short period, polymerization commenced and the rest of the above solution was dropped in during 1 hour, while continuously and slowly stirring.

5 minutes after termination of the addition of the monomer, 600 parts by weight of methanol were added slowly and drop-wise to the reaction mixture. Then the vent of the reaction vessel was closed and in the vessel there was produced a pressure of 0.5 to 1.5 atmospheres gauge pressure with the aid of nitrogen. At this pressure and at a water bath temperature of 80–90° C., polymerization was completed in 6 hours, while slowly stirring. After cooling and ventilation, the solution of polymer thus formed was diluted with 2000 parts by weight of methanol.

After determination of the content of solid matter, the solution was made up with methanol to contain 40% by weight of solid matter.

(b) *Partial saponification.*—To 478 parts by weight of the above polymer solution of 40% strength in a stirring vessel with a reflux condenser which could also be used for distillation, there were added, while stirring, at 20° C., 5.92 parts by weight of a solution of 14.45% strength of sodium hydroxide in methanol; after about 40 minutes the "viscous phase" set in, i.e. the saponification product formed became insoluble in methanol and formed temporarily a viscous jelly. This time was exactly determinable with a tolerance of ½ minute. 23 minutes after onset of this "viscous phase," a solution of 1.5 parts by weight of acetic acid in 35 parts by weight of methanol was stirred into the reaction product which had meanwhile become crumbly.

After 15 minutes, the condenser was switched to distillation and all the solvent was removed, under a reduced pressure of 40 mm. Hg, at 50° C. water bath temperature, and while stirring. There remained behind 120 parts by weight of a colorless, finely powdered modified polyvinyl alcohol.

(c) *Reaction with diketene.*—700 parts by weight of the partially saponified modified polyvinyl alcohol were allowed to swell overnight in 6300 parts by weight of acetic acid in which had been dissolved 14 parts by weight of anhydrous sodium acetate. 570 parts by weight of diketene (about 83% of the theory) were added at 20–30° C., while stirring continuously, and the whole was then heated by means of circulating heating to an internal temperature of 45° C. Then, the circulating heating was switched off. The internal temperature rose then to 58–60° C., while the polyvinyl alcohol was dissolved. The evolution of heat being termined, the reaction mixture was slowly heated to 65° C. by means of circulating heating in order to complete the reaction and then heated to 80–85° C., if no further evolution of heat was observed. The total time of reaction was 4½ to 5 hours. The solution was purified by pressing it through a cellulose filter and subsequently the main part of the acetic acid was distilled off under reduced pressure. The viscous solution was diluted with a small amount of water and the acetic acid was removed in a dialysis cell with cellophane membrane and stirring device.

*Preparation of the oil-in-water emulsion*

850 parts by weight of white spirit having a boiling range from 190–230°, were introduced by emulsification by means of a rapid stirrer into a solution of 3.3 parts by weight of the reaction product of 1 mol of triisobutylphenyl with 13 mols of ethylene oxide in 146.7 parts by weight of water 1000 parts by weight

EXAMPLE 2

A staple fiber fabric was printed with a mixture of 200 parts by weight of an aqueous solution of 25% strength of the reaction product of diketene with a modified alcohol, prepared by the process described hereinafter 30 parts by weight of the etherification product of the urea-formaldehyde precondensation product mentioned in Example 1

10 parts by weight of the diazonium chloride of 1-methyl-2-benzoylamino-4-methoxy-5-aminobenzene hydrochloride stabilized by $ZnCl_2$ and 760 parts by weight of the above-described oil-in-water emulsion.

After drying, the goods were steamed for 10 minutes at 102° C. in the presence of a formaldehyde solution of 40% strength. After rinsing and drying, there was obtained a greenish yellow print that had a very good fastness properties and a soft handle.

*Preparation of the reaction product of diketene with a modified polyvinyl alcohol*

(a) *Preparation of the starting graft copolymer.*—To 820 parts by weight of polyethylene oxide having a molecular weight of 4000, in a vessel which could be heated on a water bath and which was provided with stirrer, reflux condenser, thermometer and nitrogen supply, there was slowly added under an atmosphere of nitrogen, at 90° C. bath temperature and with stirring, a solution of 1180 parts by weight of vinyl acetate, 12 parts by weight of dibenzyl peroxide, and 300 parts by weight of methanol. The reaction mixture was then allowed to complete polymerization during 6 hours at a bath temperature of 95° C. and under an atmosphere of nitrogen of 1.5 atmosphere gauge pressure.

(b) *Saponification.*—The molten mass of the graft copolymer was dissolved in 3700 parts by weight of methanol in the same reaction vessel and saponified by the addition of 78 parts by weight of a methanolic sodium hydroxide solution. Saponification was complete after 5 hours. The reaction mixture was then subjected to steam distillation, whereby the mixture of methanol and methyl acetate was removed by distillation, while an aqueous solution of modified polyvinyl alcohol remained behind. The modified polyvinyl alcohol had the following composition:

| | Percent |
|---|---|
| Polyvinyl alcohol units | 35.7 |
| Polyvinyl acetate units | 0.9 |
| Polyethylene glycol units | 63.4 |

(c) *Reaction with diketene.*—200 parts by weight of the modified polyvinyl alcohol were suspended in 2000 parts by weight of acetic acid. 4 parts by weight of anhydrous sodium acetate were added and after it was dissolved, 196 parts by weight of diketene were dropped in during 1 hour, at 50° C., while stirring. The mixture was then pressed through a cellulose filter; 1400 parts by weight of acetic acid were separated from the filtrate by filtration under reduced pressure. The reaction product was precipitated by isopropyl ether and for being liberated from acetic acid, it was precipitated thrice from an acetonic solution by isopropyl ether and finally it was dissolved in water while simultaneously removing the ether by distillation.

We claim:

1. A process for the coloration of textile materials and foils by coating the materials with a colored film, which process consists in treating the materials with an aqueous preparation containing (A) a reaction product of diketene with a modified polyvinyl alcohol which is a graft copolymer of a vinyl ester of carboxylic acids having 1 to 4 carbon atoms on a polyalkylene glycol having a molecular weight within the range of 400 and 1,500,000 and having 2 to 4 carbon atoms in the alkylene units, the vinyl ester groups of the graft copolymer being saponified in an amount of 20 to 100%, calculated on the weight of the ester groups contained in the graft copolymer, and (B) a stabilized diazonium compound, and heating the materials to a temperature from about 90° C. to about 200° C.

2. A process for the coloration of textile materials and foils by coating the materials with a colored film, which process consists in treating the materials with an aqueous preparation containing (A) a reaction product of diketene with a modified polyvinyl alcohol which is a graft copolymer of a vinyl ester of carboxylic acids having 1 to 4 carbon atoms on a polyalkylene glycol having a molecular weight within the range of 400 and 1,500,000 and having 2 to 4 carbon atoms in the alkylene units, the vinyl ester groups of the graft copolymer being saponified in an amount of 20 to 100%, calculated on the weight of the ester groups contained in the graft polymer, (B) a stabilized diazonium compound, and (C) a precondensation product of 1 to 6 mols formaldehyde with 1 mol of a member selected from the group consisting of urea and melamine, and heating the materials to a temperature from about 90° C. to about 200° C.

3. A process for the coloration of textile materials and foils by coating the materials with a colored film, which process consists in treating the materials with an aqueous preparation containing (A) a reaction product of diketene with a modified polyvinyl alcohol which is a graft copolymer of a vinyl ester of carboxylic acids having 1 to 4 carbon atoms on a polyalkylene glycol having a molecular weight within the range of 400 and 1,500,000 and having 2 to 4 carbon atoms in the alkylene units, the vinyl ester groups of the graft copolymer being saponified in an amount of 20 to 100%, calculated on the weight of the ester groups contained in the graft polymer, (B) a stabilized diazonium compound, and (C) a precondensation product of 1 to 6 mols formaldehyde with 1 mol of a member selected from the group consisting of urea and melamine, which precondensation product is at least partially etherified with an alcohol containing 1 to 4 carobn atoms and 1 to 2 hydroxyl groups, and heating the materials to a temperature from about 90° C. to about 200° C.

4. A process for the coloration of textile materials and foils by coating the materials with a colored film, which process consists in treating the materials with an aqueous preparation containing a reaction product of diketene with a modified polyvinyl alcohol which is a graft copolymer of vinyl esters of carboxylic acids having 1 to 4 carbon atoms on a polyalkylene glycol having a molecular weight within the range of 400 and 1,500,000 and having from 2 to 4 carbon atoms in the alkylene units, the vinyl ester groups of the graft copolymer being saponified in an amount from 20 to 100%, calculated on the weight of the ester groups contained in the graft copolymer, drying at a temperature up to 80° C., then treating the materials with an equeous preparation containing a stabilized diazonium compound, and heating materials at a temperature from about 90° to about 200° C.

5. A process for the coloration of textile materials and foils by coating the materials with a colored film, which process consists in treating the materials with an aqueous preparation containing a reaction product of diketene with a modified polyvinyl alcohol which is a graft copolymer of vinyl esters of carboxylic acids having 1 to 4 carbon atoms on a polyalkylene glycol having a molecular weight within the range of 400 and 1,500,000 and having from 2 to 4 carbon atoms in the alkylene units, the vinyl ester groups of the graft copolymer being saponified in an amount from 20 to 100%, calculated on the weight of the ester groups contained in the graft copolymer, and a precondensation product of 1 to 6 mols of formaldehyde and 1 mol of a member selected from the group consisting of urea and melamine, then treating the materials with an aqueous preparation containing a stabilized diazonium compound, and heating the materials at a temperature from about 90° C. to about 200° C.

6. A process for the coloration of textile materials and foils by coating the materials with a colored film, which process consists in treating the materials with an aqueous preparation containing a reaction product of diketene with a modified polyvinyl alcohol which is a graft copolymer of vinyl esters of carboxylic acids having 1 to 4 carbon atoms on a polyalkylene glycol having a molecular weight within the range of 400 and 1,500,000 and having from 2 to 4 carbon atoms in the alkylene units, the vinyl ester groups of the graft copolymer being saponified in an amount from 20 to 100%, calculated on the weight of the ester groups contained in the graft copolymer, and a precondensation product of 1 to 6 mols of formaldehyde and 1 mol of a member selected from the group consisting of urea and melamine, which precondensation product is at least partially etherified with alcohol containing 1 to 4 carbon atoms and 1 to 2 hydroxyl groups then treating the materials with an aqueous preparation containing a stabilized diazonium compound, and heating the materials at a temperature from about 90° C. to about 200° C.

7. A process as claimed in claim 1, wherein the fixation by heating at a temperature from about 90° C. to about 200° C. is carried out by steaming at a temperature of 90° up to 120° C. during 5 to 10 minutes.

8. A process as claimed in claim 1, wherein the fixation by heating at a temperature from about 90° C. to about 200° C. is carried out by dry heating at 100° up to 200° C. during 30 seconds up to 10 minutes.

9. A process as claimed in claim 1, wherein the fixation by heating at a temperature from about 90° C. to about 200° C. is carried out by steaming in the presence of formaldehyde.

10. A process as claimed in claim 1, wherein the materials are aftertreated at 95°–100° C. with an aqueous solution of formaldehyde.

11. A process as claimed in claim 4, wherein the fixation by heating at a temperature from about 90° C. to about 200° C. is carried out by a steaming in the presence of formaldehyde.

12. A process as claimed in claim 4, wherein the materials are aftertreated at 95°–100° C. with an aqueous solution of formaldehyde.

13. A coating composition containing (A) a reaction product of diketene with a modified polyvinyl alcohol, which is a graft copolymer of a vinyl ester of carboxylic acids having 1 to 4 carbon atoms on a polyalkylene glycol having a molecular weight within the range of 400 to 1,500,000 and having 2 to 4 carbon atoms in the alkylene units, the vinyl ester groups of the graft copolymer being saponified in an amount of 20 to 100%, calculated on the weight of the ester groups contained in the graft copolymer, and (B) a stabilized diazonium compound.

14. A coating composition containing (A) a reaction product of diketene with a modified polyvinyl alcohol, which is a graft polymer of a vinyl ester of carboxylic acids having 1 to 4 carbon atoms on a polyalkylene glycol having a molecular weight within the range of 400 to 1,500,000 and having 2 to 4 carbon atoms in the alkylene units, the vinyl ester groups of the graft polymer being saponified in an amount of 20 to 100%, calculated on the weight of the ester groups contained in the graft polymer, (B) a stabilized diazonium compound, and (C) a precondensation product of 1 to 6 mols of formaldehyde with 1 mol of a member selected fro mthe group consisting of urea and melamine.

15. A coating composition containing (A) reaction products of diketene with a modified polyvinyl alcohol, which is a graft copolymer of a vinyl ester of carboxylic acids having 1 to 4 carbon atoms on a polyalkylene glycol having a molecular weight within the range of 400 to 1,500,000 and having 2 to 4 carbon atoms in the alkylene units, the vinyl ester groups of the graft copolymer being saponified in an amount of 20 to 100%, calculated on the weight of the ester groups contained in the graft copolymer, (B) a stabilized diazonium compound, and (C) a precondensation product of 1 to 6 mols of formaldehyde with 1 mol of a member selected from the group consisting of urea and melamine, which precondensation product is at least partially etherified with an alcohol containing 1 to 4 carbon atoms and 1 to 2 hydroxyl groups.

No references cited.

MURRAY TILLMAN, *Primary Examiner.*
JAMES A. SEIDLECK. *Examiner.*